US009221211B2

(12) United States Patent
Klein

(10) Patent No.: US 9,221,211 B2
(45) Date of Patent: Dec. 29, 2015

(54) HEAT/VACUUM MOLDING SYSTEM FOR FOOTWEAR

(76) Inventor: Greg Klein, Pittsburgh, PA (US)

( * ) Notice: Subject to any disclaimer, the term of this patent is extended or adjusted under 35 U.S.C. 154(b) by 592 days.

(21) Appl. No.: 13/480,047

(22) Filed: May 24, 2012

(65) Prior Publication Data

US 2013/0134638 A1     May 30, 2013

Related U.S. Application Data

(60) Provisional application No. 61/564,097, filed on Nov. 28, 2011.

(51) Int. Cl.
*B29C 51/36*     (2006.01)
*B29C 51/10*     (2006.01)
*B29C 51/42*     (2006.01)

(52) U.S. Cl.
CPC ............... *B29C 51/10* (2013.01); *B29C 51/36* (2013.01); *B29C 51/421* (2013.01)

(58) Field of Classification Search
CPC ........ B29C 51/10; B29C 51/16; B29C 51/18; B29C 51/42; B29C 51/28
USPC .................. 425/2, 23, 24, DIG. 60
See application file for complete search history.

(56) References Cited

U.S. PATENT DOCUMENTS

| | | | | | |
|---|---|---|---|---|---|
| 3,334,383 | A | * | 8/1967 | Irvine | 425/389 |
| 3,608,055 | A | * | 9/1971 | Long | 264/316 |
| 3,848,286 | A | * | 11/1974 | Kahmann | 12/142 P |
| 3,848,287 | A | * | 11/1974 | Simonsen | 12/142 P |
| 3,886,027 | A | * | 5/1975 | Hoffmann | 156/380.5 |
| 3,917,122 | A | * | 11/1975 | Swan et al. | 222/146.5 |
| 3,964,958 | A | * | 6/1976 | Johnston | 156/382 |
| 4,034,054 | A | * | 7/1977 | Sauer | 264/313 |
| 4,548,563 | A | * | 10/1985 | Aigrefeuille | 425/2 |
| 4,651,444 | A | * | 3/1987 | Ours | 36/93 |
| 4,906,425 | A | * | 3/1990 | Poussou | 264/102 |
| 4,964,229 | A | * | 10/1990 | Laberge | 36/93 |
| 4,979,252 | A | * | 12/1990 | Daley | 12/142 N |
| 5,275,775 | A | * | 1/1994 | Riecken | 264/222 |
| 5,358,394 | A | * | 10/1994 | Riecken | 425/2 |
| 5,376,127 | A | * | 12/1994 | Swanson | 623/27 |
| 5,632,936 | A | * | 5/1997 | Su et al. | 264/2.5 |
| 5,776,509 | A | * | 7/1998 | Ota et al. | 425/111 |
| 5,843,483 | A | * | 12/1998 | Theriault et al. | 425/2 |
| 5,894,680 | A | * | 4/1999 | Dalvy et al. | 34/437 |
| 6,007,748 | A | * | 12/1999 | Krajcir | 264/46.4 |
| 6,228,300 | B1 | * | 5/2001 | Brown | 264/134 |
| 6,994,532 | B2 | * | 2/2006 | Vachon et al. | 425/2 |
| 8,549,688 | B2 | * | 10/2013 | Leitner et al. | 12/114.2 |
| 2001/0016992 | A1 | * | 8/2001 | Gross | 36/84 |
| 2002/0047228 | A1 | * | 4/2002 | Vachon et al. | 264/322 |
| 2004/0025221 | A1 | * | 2/2004 | Clark | 2/159 |
| 2004/0076700 | A1 | * | 4/2004 | Horiguchi et al. | 425/2 |
| 2004/0134106 | A1 | * | 7/2004 | Kim | 40/310 |
| 2006/0038320 | A1 | * | 2/2006 | Straub et al. | 264/265 |

(Continued)

*Primary Examiner* — Yogendra Gupta
*Assistant Examiner* — Emmanuel S Luk
(74) *Attorney, Agent, or Firm* — Kegler Brown Hill & Ritter; James J. Pingor

(57) ABSTRACT

A heat/vacuum molding system for molding a ski boot to a user's foot is provided. The system includes a heat source to heat an outer shell of the ski boot, a pliable plastic receptacle to receive the ski boot after the outer shell is heated by the heat source, and a vacuum system attached to the pliable plastic receptacle to create a negative pressure inside the pliable plastic receptacle to thereby collapse the pliable plastic receptacle to mold the ski boot to the user's foot.

13 Claims, 7 Drawing Sheets

(56) References Cited

U.S. PATENT DOCUMENTS

| | | | |
|---|---|---|---|
| 2007/0194475 A1* | 8/2007 | Wilenski et al. | 264/40.6 |
| 2008/0003322 A1* | 1/2008 | Reed | 425/388 |
| 2009/0011063 A1* | 1/2009 | Davie et al. | 425/144 |
| 2010/0236101 A1* | 9/2010 | Leitner et al. | 36/117.1 |
| 2012/0126450 A1* | 5/2012 | Van Berkum et al. | 264/222 |

\* cited by examiner

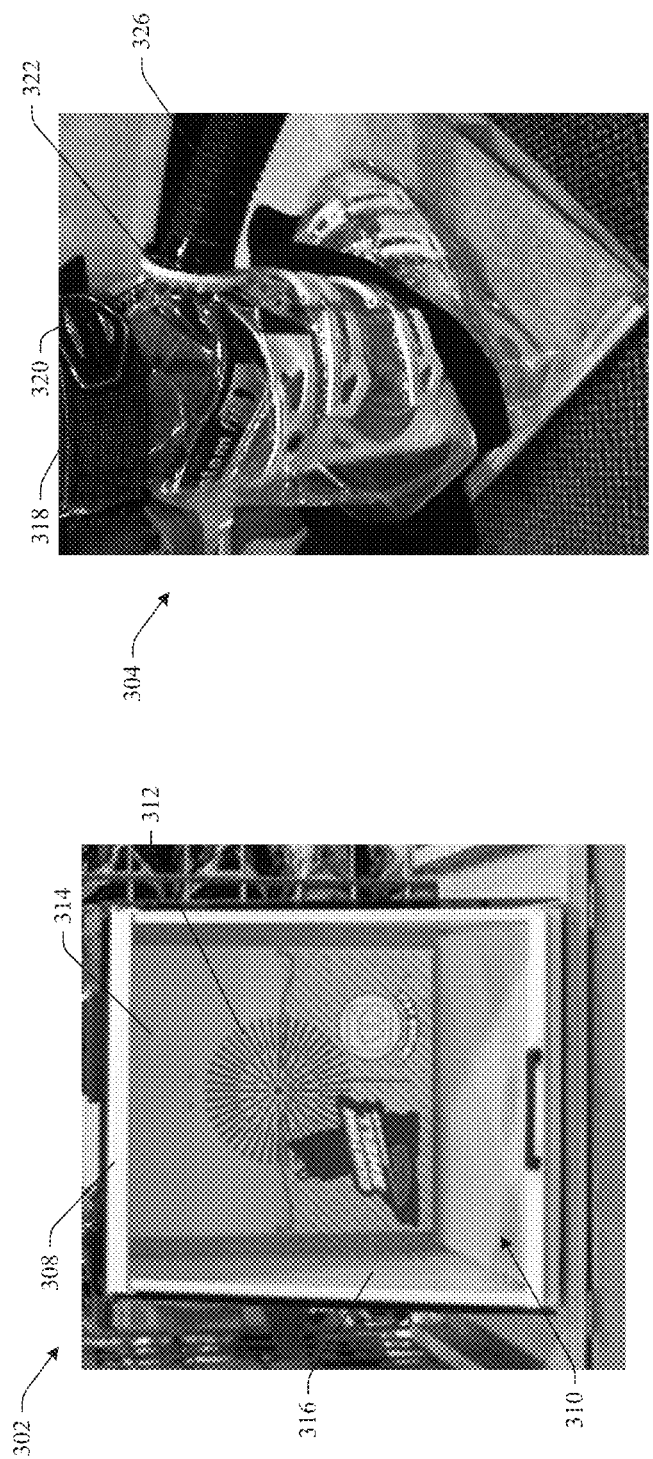
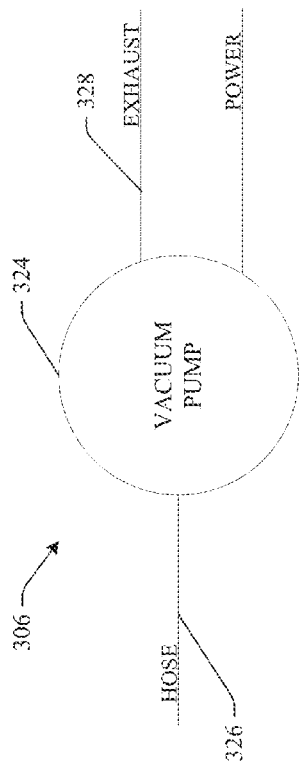
FIG. 3B
FIG. 3C
FIG. 3A

HEAT/VACUUM MOLDING SYSTEM FOR FOOTWEAR

CROSS-REFERENCE TO RELATED APPLICATIONS

This application claims the benefit of U.S. Provisional Patent application Ser. No. 61/564,097 entitled VACUUM MOLDING SYSTEM FOR FOOTWEAR filed on Nov. 28, 2011. The entireties of the above-noted applications are incorporated by reference herein.

ORIGIN

The innovation disclosed herein relates to footwear and more specifically, to a vacuum molding system for form fitting an outer of a ski boot to a user.

BACKGROUND

Ski boots are specialized footwear that attaches a skier to skis via bindings. While skiing, the boot/binding synergy enables a skier to navigate and transmit control inputs within and to the snow. Originally, ski boots were similar to shoes or boots and manufactured of leather. As technology continues to advance and skiing becomes more specialized, ski and ski boot technology also advances.

Generally, boots intended for downhill use (e.g., Alpine) employ a hard plastic shell with a softer foam liner that provides warmth and comfort. Skiers will appreciate that a thick soft liner will be more comfortable and provide more insulation while thinner, harder liners usually provide more precision and overall control. While comfort continues to improve through the use of conformable linings which allow an otherwise stiff liner to be molded to the foot and comfortably accept a large variety of foot shapes, not much advancement of form fitting an outer shell has been made.

In order to accommodate intended use, comfort and performance goals, shells come in various degrees of stiffness. Beginners typically like a softer and more padded boot that provides warmth and comfort, while more advanced and competitive skiers generally prefer a stiffer boot with a thinner liner which provides them with more precision and control.

By design, most often, softer boots are lighter due to thinner shell material. By contrast, increased boot stiffness generally translates into more precise energy transmission from the skier to the ski. Thus, more aggressive and competitive skiers usually tend to favor a more rigid boot. Unfortunately, stiff boots are often less comfortable and heavier than their softer counterparts.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, a heat/vacuum molding system for transforming a heatable/formable item into a form fitted item is provided. The system includes a heat source to heat the heatable/formable item, a vacuum receptacle to receive the heatable/formable item after the heatable/formable item is heated by the heat source, and a vacuum system attached to the vacuum receptacle to create a negative pressure inside the vacuum receptacle to thereby collapse the vacuum receptacle to transform the heatable/formable item into a form fitted item.

In another aspect of the innovation a heat/vacuum molding system for molding a ski boot to a user's foot is provided. The system includes a heat source to heat an outer shell of the ski boot, a pliable plastic receptacle to receive the ski boot after the outer shell is heated by the heat source, and a vacuum system attached to the pliable plastic receptacle to create a negative pressure inside the pliable plastic receptacle to thereby collapse the pliable plastic receptacle to mold the ski boot to the user's foot.

In still yet another aspect of the innovation a method of molding a ski boot to a user's foot is provided. The method includes placing an outer shell of the ski boot in a heat source, heating to a temperature in the range of 175 to 225 degrees Fahrenheit for a time period in the range of 10-15 minutes, placing ski boot in a pliable collapsible receptacle and sealing receptacle, pumping air out of pliable collapsible receptacle thereby collapsing receptacle against ski boot, conforming ski boot to user's foot, and removing ski boot from user's foot and cool to ambient temperature.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 3A-3C illustrates example components of the heat/vacuum molding system of FIG. 1 in accordance with an aspect of the innovation.

DETAILED DESCRIPTION

Figure 1:
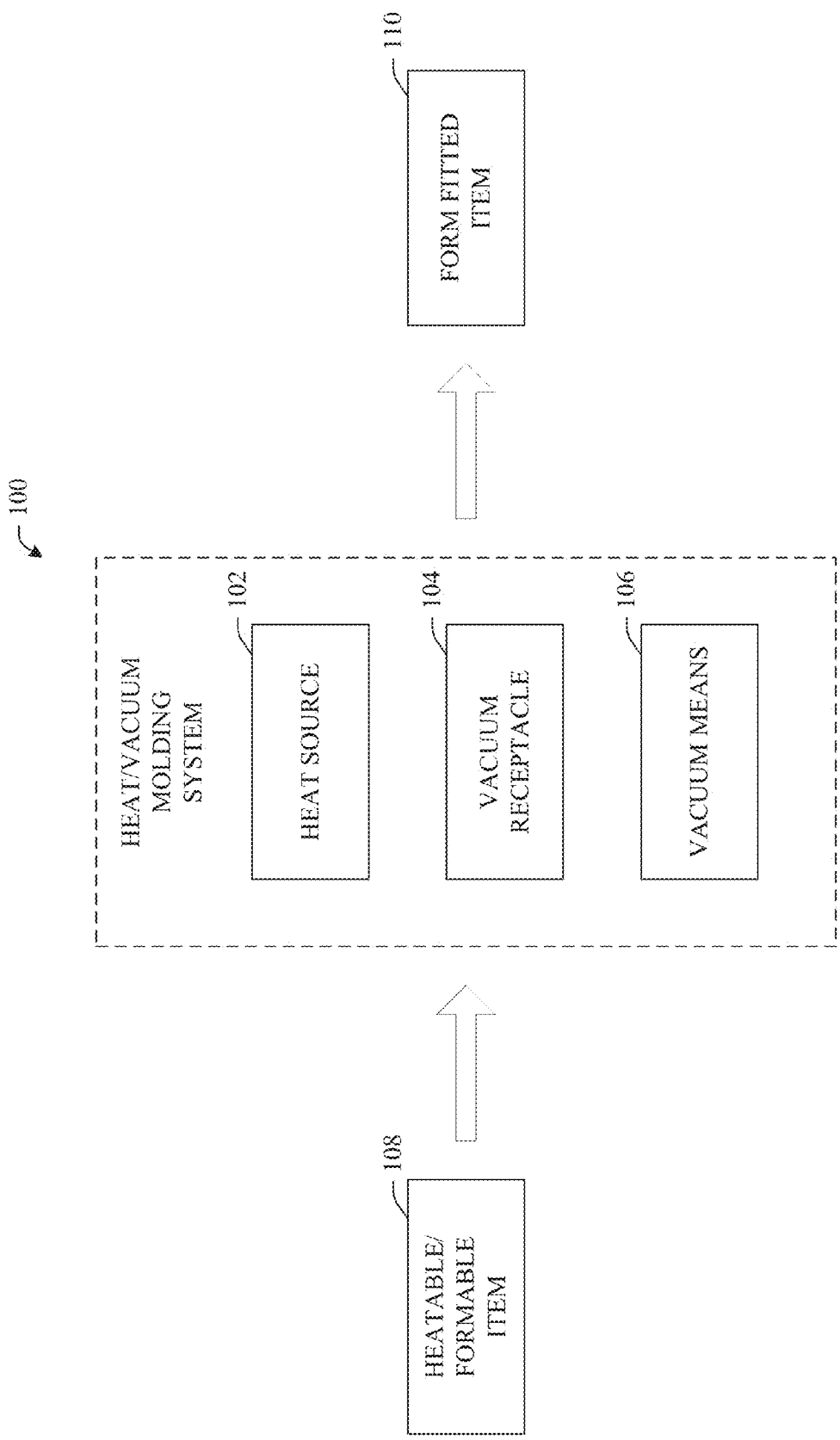
FIG. 1 is illustrates an example block diagram of a heat/vacuum molding system to form fit a heatable/formable item in accordance with an aspect of the innovation

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

With reference now to the figures, FIG. 1 is a block diagram representation of a heat/vacuum molding (or fitting) system 100 for form fitting footwear to a user's body in accordance with the innovation. Vacuum molding is the process by which a ski boot is formed fitted (conformed) to a skier's body so that any irregularity, large or small, is accommodated by the molding process. Due to the heating and cooling properties of an outer shell of the ski boot, the outer shell maintains the resultant form, which enhances the comfort and functionality of the ski boot.

Still referring to FIG. 1, the system 100 includes a heat source 102, a vacuum receptacle 104, and a vacuum means 106. The system 100 performs a process that takes a heatable/formable item (e.g., ski boot, footwear, etc.) 108 and transforms it into a form fitted item 110. Although, the system 100 described herein relates to a system and method to form fit an outer shell of a ski boot to a user's foot (ankle and shin) for a tighter, more functional and comfortable fit, it is to be appreciated that the innovation has many applications, such as but not limited to, footwear in general and any other suitable apparel. Thus, the example embodiment described herein and illustrated in the figures is for illustrative purposes only and is not intended to limit the scope of the innovation.

Figure 2:
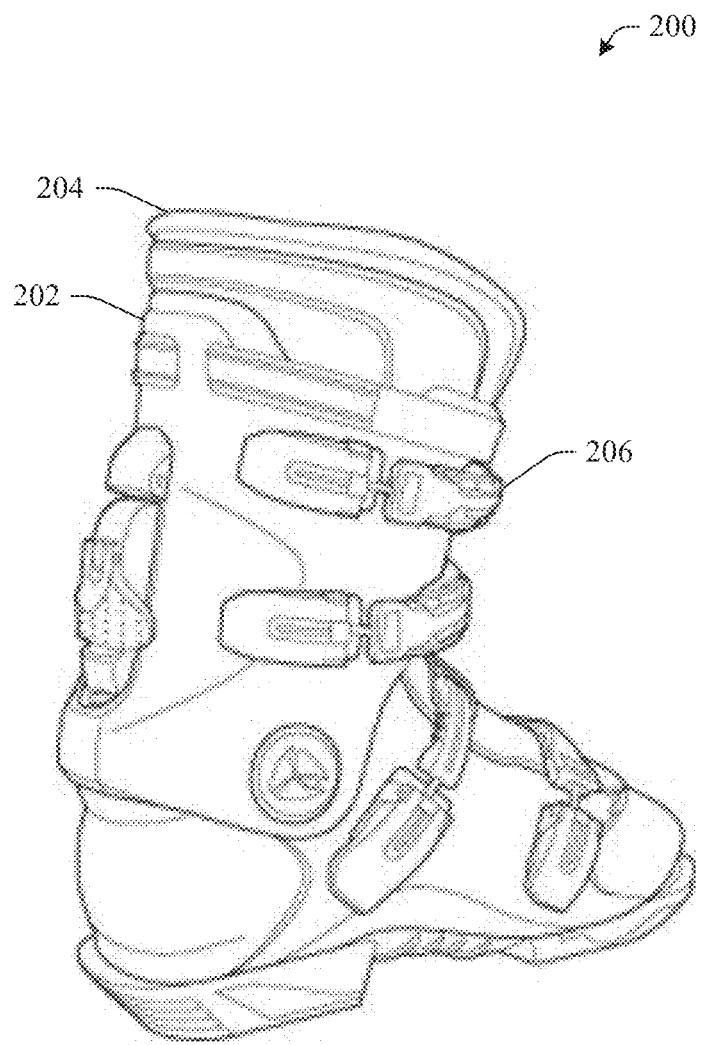
FIG. 2 is a perspective view of a heatable/formable item in accordance with an aspect of the innovation.

FIG. 2 is an example embodiment of a heatable/formable item 108 in accordance with aspects of the innovation. Specifically, the example heatable/formable item 108 is a ski boot 200 having an outer shell 202, an inner liner 204 and multiple fasteners (e.g. buckles) 206. As mentioned above, ski boots are specialized footwear that are used for skiing to enable the user (skier) to navigate the terrain of a snow covered ski area. While advancements in technology have been made in terms of form fitting the inner liner 204, there exists a need in the art for an efficient and effect method to mold or otherwise form the boot shell 202 to an individual skier's foot, ankle and shin.

FIGS. 3A-3C illustrate example embodiments of the heat source 102, the vacuum receptacle 104, and the vacuum means 106 in accordance with aspects of the innovation. Specifically, the heat source 102 is a convection oven 302, the vacuum receptacle 104 is a plastic bag 304, and the vacuum means 106 is a vacuum system 306.

Referring to FIG. 3A, the example convection oven 302 includes a housing 308 having a cavity 310 defined therein, a heating element (not shown), a convection fan 312 attached to a rear panel 314 of the housing 308, and a door 316. It is to be appreciated, that the heat source 102 is not limited to a convection oven. Rather, the heat source 102 can be any suitable heat source 102, such as but not limited to, a conventional oven, microwaves, etc. The oven 302 further includes controls to regulate an oven temperature, an operation of the fan 312, and a heating/cooling time of the oven 302.

Referring to FIG. 3B, the example reinforced plastic bag 304 conforms to the shape of the heatable/formable item 108 upon the formation of the form fitted item 110. The plastic bag 304 is made from a pliable material, such as but not limited to polypropylene, polyethylene, etc., that can conform to the shape of the heatable/formable item 108. The plastic bag 304 includes an opening to allow insertion of the heatable/formable item 108 and a sealing device 318 to seal off the opening once the heatable formable item 108 is inserted into the plastic bag 304. In the example embodiment, the sealing device 318 is a strap that wraps around the shin area of the user and fastens to itself by means of a hook and loop, snap, buckle, etc. to thereby close off the opening. It is to be appreciated that the sealing device 318 can be any type of mechanical strap type device, such as but not limited to, a pull string integrated into the plastic bag 304 and disposed around the opening, an elastic band, etc., as long as the sealing device 318 prevents outside air from entering the plastic bag 304 through the opening.

The plastic bag 304 further includes a port 320 to accommodate the attachment of the vacuum means 106. The port 320 serves as both an outlet port to allow air to be pulled from within the plastic bag 304 and an intake port to allow air to reenter the plastic bag upon completion of the vacuum portion of the forming process, described further below. A ring 322 is provided around a perimeter of the port 320 to facilitate the attachment of the vacuum means 106 to the plastic bag 304.

The vacuum means 106 is a vacuum system 306 that includes a vacuum pump 324, a vacuum hose 326, and an exhaust 328. The vacuum system 306 evacuates the air from inside the vacuum receptacle 104 so as to create a negative pressure on the heatable/formable item 108 to transform the heatable/formable item 108 into the form fitted item 110. As illustrated in the figures, the vacuum hose 326 attaches directly to the port 320 on the plastic bag 304, as shown in FIG. 3B.

Figure 4:
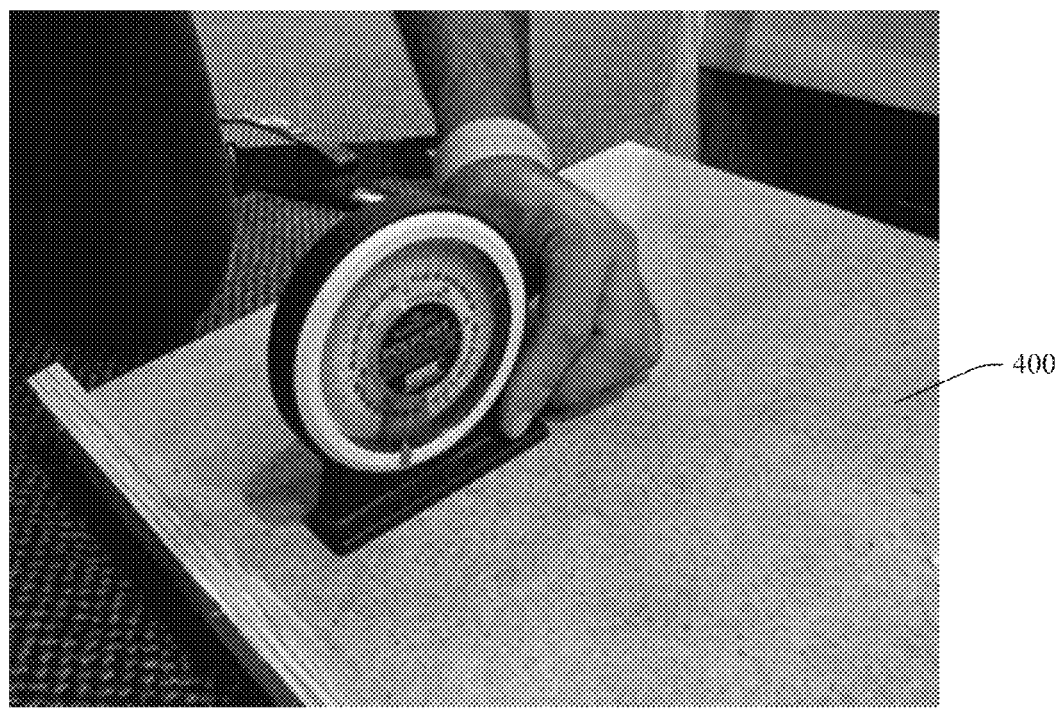
FIGS. 4 and 5 are illustrations of an optional inclined platform in accordance with an aspect of the innovation.
Figure 5:
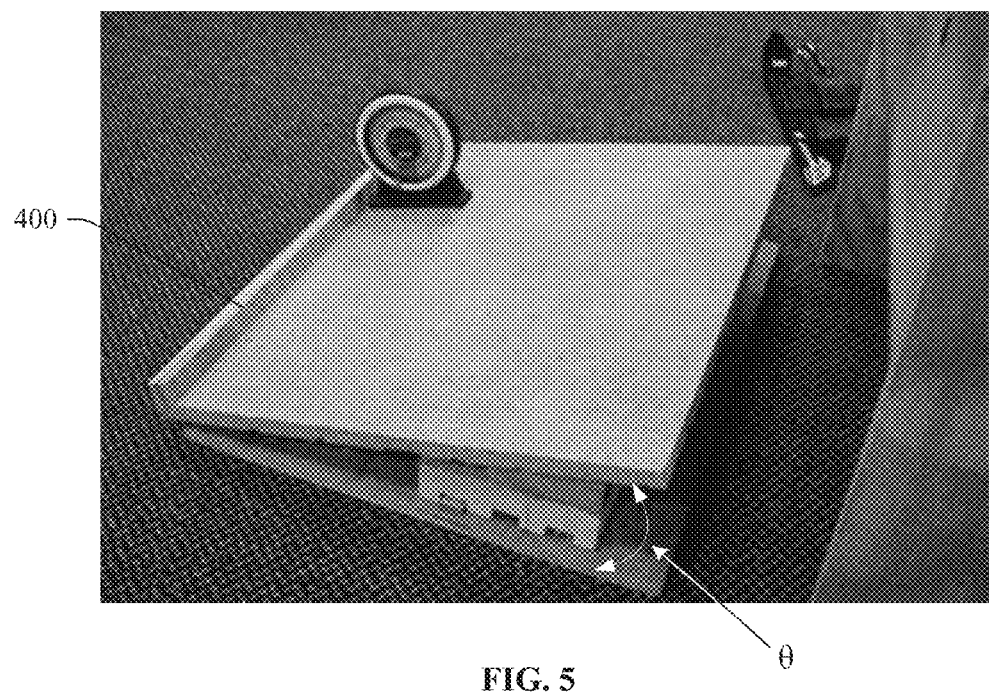

As shown in FIGS. 4 and 5, an adjustable-inclined platform 400 can be provided for certain applications. For example, in the example ski boot embodiment the platform 400 can be provided to accommodate the forward lean of the ski boot 200, during the fitting process. The platform 400 may be adjustable or may be fixed as a predetermined angle θ in a range between 14 and 18 degrees.

Figure 6:
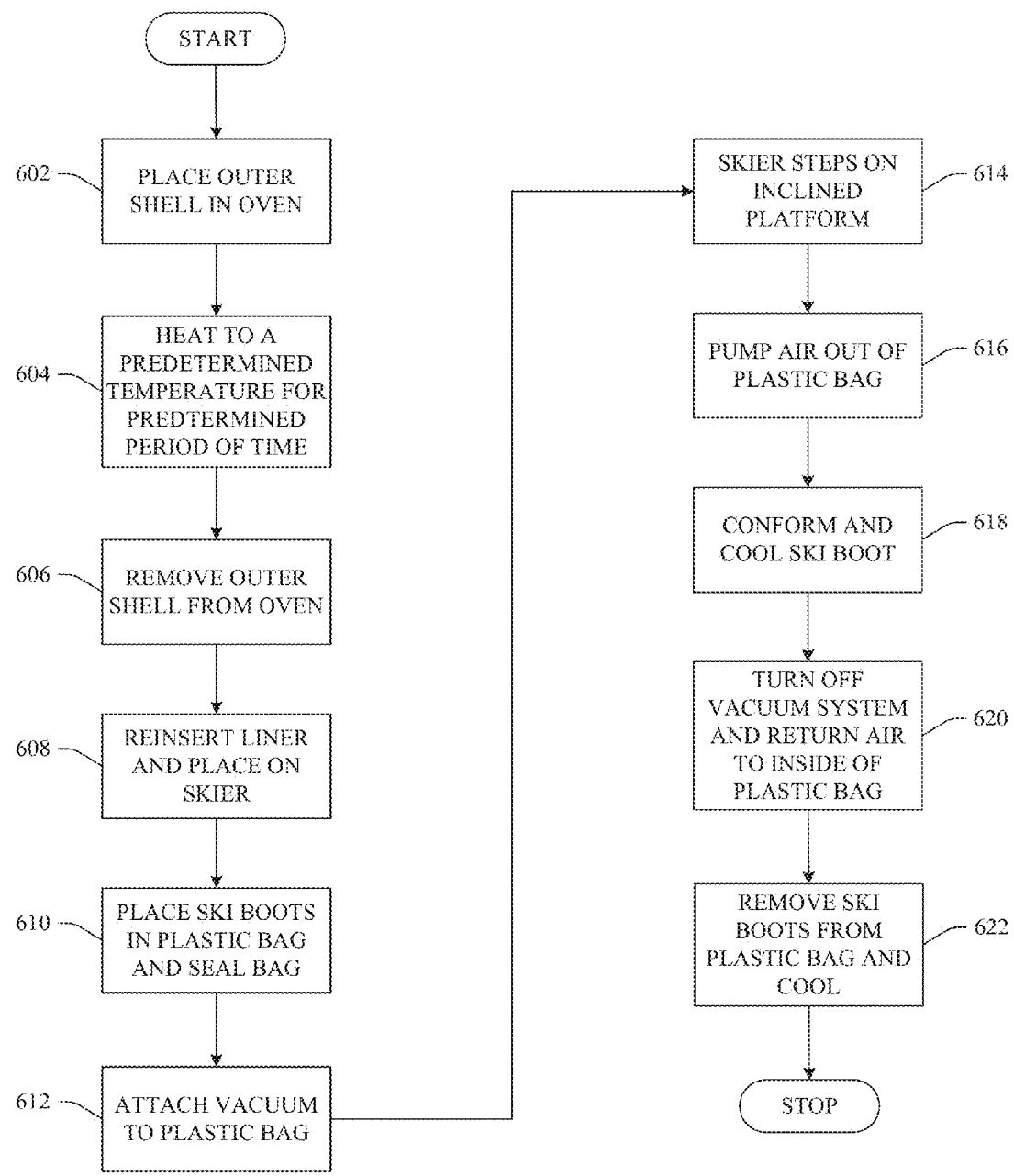
FIG. 6 illustrates an example flow chart of form fitting the heatable/formable item in the heat/vacuum molding system of FIG. 1 in accordance with an aspect of the innovation.

Referring to FIG. 6, a method 600 of transforming a heatable/formable item 108 (e.g., ski boot 200) into a form fitted item 110 will be described. As mentioned above, although the method will be described in relation to form fitting (or molding) an outer shell 202 of a ski boot 200 to a user's foot, the method has many applications, including but not limited to footwear in general. Thus, for purposes of illustration only, a ski boot 200 having an outer shell 202 is described in the following method.

Figure 7:
FIG. 7 is an illustration of a portion of the method of FIG. 6 in accordance with an aspect of the innovation.

At 602, the ski boots 200, more specifically, the outer shells 202 with the inner liner 204 removed, are placed in the oven 302 (see FIG. 7). At 604, the outer shells 202 are heated to a temperature in the range of 175 to 225 degrees Fahrenheit for approximately 10-15 minutes. It is to be understood and appreciated that the temperature and time of heating can be design dependent upon many factors, including but not limited to, rigidity and material composition of the boot shell 202, the skiers ability, etc. At 606, the outer shells 202 are removed from the oven 302. At 608, the liners 204 are re-inserted into the outer shells 202 and the skier puts the boots 200 on and buckles each ski boot 200 to an appropriate buckle 206 (e.g., first buckle, second buckle, etc.). At 610, each ski boot 200 is placed inside a separate plastic bag 304 and sealed with the sealing device 318. At 612, the vacuum hose 326 is attached to the port 320 on each plastic bag 304.

Figure 8:
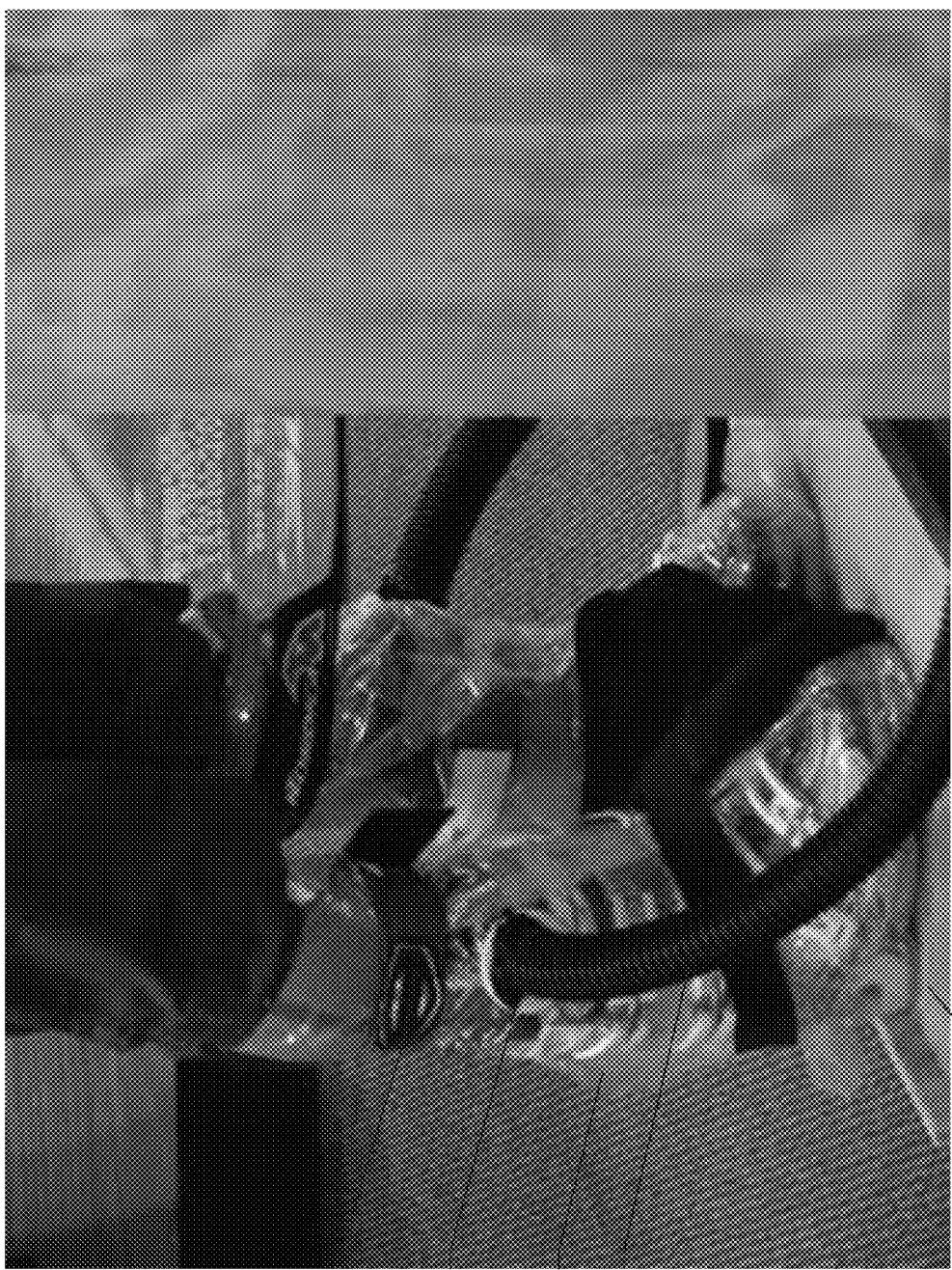
FIG. 8 is an illustration of a portion of the method of FIG. 6 in accordance with an aspect of the innovation.

At 614, the skier steps onto the inclined platform 400 (see FIG. 8). Alternatively, the skier can simply lean forward to a comfortable angle. At 616, the vacuum system 306 is actuated thereby pumping air out of each plastic bag 304. As mentioned above, the plastic bag 304 collapses and conforms to the shape of the ski boot 200. At 618, due to the negative pressure on the heated outer shell 202 of the ski boot 200, the outer shell 202 and ski boot 200 conforms to the skier's foot, ankle and shin. The vacuum system 306 remains on until the outer shell 202 of the ski boot 200 has cooled sufficiently cooled such that the outer shell 202 can maintain the new shape. This time period can vary depending on the material properties of the outer shell 202. At 620, the vacuum system 306 is turned off and air returns to the inside of the plastic bag 304. At 622, the skier removes the ski boots 200 and the ski boots 200 are fully buckled and cooled to an ambient temperature.

It is to be appreciated, that once the transformation process is complete, adjustments can be performed on the form fitted item 110 to insure a proper fit. In other words, the item can be re-heated in the oven and the process repeated to perform fine adjustments. Alternatively, fine adjustments can also be made to the item by spot heating the item with an alternative heat source (e.g., heat gun) in a desired location and repeating the process.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A heat/vacuum molding system for transforming a heatable/formable item into a form fitted item comprising:
   a heat source to heat the heatable/formable item;
   a vacuum receptacle to receive the heatable/formable item after the heatable/formable item is heated by the heat source;
   a vacuum system attached to the vacuum receptacle to create a negative pressure inside the vacuum receptacle to thereby collapse the vacuum receptacle to transform the heatable/formable item into a form fitted item; and
   an adjustable inclined platform external to the heatable/formable item, wherein the heatable/formable item is placed on a top of the adjustable inclined platform to thereby incline a front of the heatable/formable item with respect to a rear of the heatable/ formable item at an angle that simulates a forward lean of the heatable/formable item.

2. The heat/vacuum molding system of claim 1, wherein the heatable/formable item is an outer shell of a ski boot and the form fitted item is the ski boot.

3. The heat/vacuum molding system of claim 2, wherein the heat source is one of a convection oven, conventional oven or microwave oven.

4. The heat/vacuum molding system of claim 3, wherein the heatable/formable item is heated to a temperature in the range of 175 to 225 degrees Fahrenheit for a time period in the range of 10-15 minutes.

5. The heat/vacuum molding system of claim 2, wherein the vacuum receptacle is pliable bag that includes an opening for insertion of the heatable/formable item, a port for attachment of the vacuum system, and a sealing device to seal the opening after insertion of the heatable/formable item.

6. The heat/vacuum molding system of claim 5, wherein the pliable bag is made from one of polypropylene or polyethylene, and wherein the sealing device is a strap that fastens to itself via a fastener comprising one of a hook and loop fastener, snaps, buttons, zipper or a buckle.

7. The heat/vacuum molding system of claim 2, wherein the vacuum system includes a pump and a hose, wherein the hose attaches to the port.

8. The heat/vacuum molding system of claim 1, wherein the inclined platform is at an angle in the range of 14-18 degrees.

9. A heat/vacuum molding system for molding a ski boot to a user's foot comprising:
   a heat source to heat an outer shell of the ski boot;
   a pliable plastic receptacle to receive the ski boot after the outer shell is heated by the heat source;
   a vacuum system attached to the pliable plastic receptacle to create a negative pressure inside the pliable plastic receptacle to thereby collapse the pliable plastic receptacle to mold the ski boot to the user's foot; and
   an adjustable inclined platform that inclines a front of the ski boot with respect to a rear of the ski boot at an angle in a range of 14-18 degrees when the ski boot is placed on a top of the inclined platform thereby simulating a forward lean of the ski boot.

10. The heat/vacuum molding system of claim 9, wherein the heat source is one of a convection oven, conventional oven or microwave oven.

11. The vacuum molding system of claim 10, wherein the outer shell is heated to a temperature in the range of 175 to 225 degrees Fahrenheit for a time period in the range of 10-15 minutes.

12. The vacuum molding system of claim 9, wherein the pliable plastic receptacle is a pliable bag that includes an opening for insertion of the ski boot, a port for attachment of the vacuum system, and a sealing device to seal the opening after insertion of the ski boot.

13. The vacuum molding system of claim 12, wherein the pliable bag is made from one of polypropylene or polyethylene, and wherein the sealing device is a strap that fastens to itself via a fastener comprising one of a hook and loop fastener, snaps, buttons, zipper or a buckle.

* * * * *